US012688589B2

(12) United States Patent
Yoshikawa

(10) Patent No.: US 12,688,589 B2
(45) Date of Patent: Jul. 21, 2026

(54) PERSON TRACKING SYSTEM, PERSON TRACKING METHOD, AND STORAGE MEDIUM

(71) Applicant: NEC Corporation, Tokyo (JP)

(72) Inventor: Takashi Yoshikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 242 days.

(21) Appl. No.: 18/715,787

(22) PCT Filed: Dec. 8, 2021

(86) PCT No.: PCT/JP2021/045039
§ 371 (c)(1),
(2) Date: Jun. 3, 2024

(87) PCT Pub. No.: WO2023/105661
PCT Pub. Date: Jun. 15, 2023

(65) Prior Publication Data
US 2025/0029265 A1      Jan. 23, 2025

(51) Int. Cl.
G06T 7/246 (2017.01)
G06F 16/22 (2019.01)
G06V 40/10 (2022.01)

(52) U.S. Cl.
CPC .......... G06T 7/246 (2017.01); G06F 16/2255 (2019.01); G06V 40/10 (2022.01); G06T 2207/30196 (2013.01)

(58) Field of Classification Search
CPC .......... G06T 7/246; G06T 2207/30196; G06F 16/2255; G06V 40/10; G06V 20/52; G06V 40/103; G06V 40/173; H04N 7/18
See application file for complete search history.

(56) References Cited

U.S. PATENT DOCUMENTS

| | | |
|---|---|---|
| 2016/0012280 A1 | 1/2016 | Ito et al. |
| 2018/0032796 A1* | 2/2018 | Kuharenko ............... G06T 1/20 |
| 2018/0165546 A1 | 6/2018 | Skans et al. |

FOREIGN PATENT DOCUMENTS

| | | |
|---|---|---|
| JP | 2006-236255 A | 9/2006 |
| JP | 2006-350683 A | 12/2006 |

(Continued)

OTHER PUBLICATIONS

International Search Report for PCT Application No. PCT/JP2021/045039, mailed on Mar. 8, 2022.

(Continued)

*Primary Examiner* — Abhishek Sarma
(74) *Attorney, Agent, or Firm* — Sughrue.Mion, PLLC

(57) ABSTRACT

In a person tracking system, a calculation processing means performs processing for detecting a first person from an image, and calculates a first feature vector representing a feature of the detected first person. A data transmission processing means acquires a hash value corresponding to a key generated based on information relating to the first feature vector, and stores feature data including the first feature vector and the key in a storage area of an external device determined based on the acquired hash value. A determination processing means determines whether or not the first person represented by the first feature vector included in the feature data read from the external device and a second person registered in advance are the same person. A tracking processing means tracks the first person as a tracking target, when it is determined that the first person and the second person are the same person.

7 Claims, 13 Drawing Sheets

(56)  References Cited

FOREIGN PATENT DOCUMENTS

| | | | |
|----|----------------|-----|---------|
| JP | 2007-142527 | A   | 6/2007  |
| JP | 2018-139103 | A   | 9/2018  |
| JP | 2020-177318 | A   | 10/2020 |
| JP | 2021-177300 | A   | 11/2021 |
| WO | 2014/132841 | A1  | 9/2014  |

OTHER PUBLICATIONS

JP Office Action for JP Application No. 2023-565760, mailed on
Apr. 15, 2025 with English Translation.

* cited by examiner

<u>110</u>

<u>120</u>

PERSON TRACKING SYSTEM, PERSON TRACKING METHOD, AND STORAGE MEDIUM

This application is a National Stage Entry of PCT/JP2021/045039 filed on Dec. 8, 2021, the contents of all of which are incorporated herein by reference, in their entirety.

TECHNICAL FIELD

The present disclosure relates to a technique for tracking a person.

BACKGROUND ART

There are known techniques for tracking a specific person using images taken by a camera.

Specifically, for example, Patent Document 1 discloses a technique for calculating a flow line of a tracked person in a shot image using an image shot by a camera and information of a shooting area and a shooting time associated with the image.

Further, for example, Patent Document 2 discloses a technique for identifying and tracking a moving object extracted from the image by determining the correlation of the feature quantity between the overall shape of the moving object calculated from the image captured by each of the plurality of cameras and the shape of the moving object extracted from the image, in a moving object monitoring system for monitoring the moving object moving across a plurality of cameras.

PRECEDING TECHNICAL REFERENCES

Patent Document

Patent Document 1: Japanese Patent Application Laid-Open under No. 2006-236255
Patent Document 2: Japanese Patent Application Laid-Open under No. 2007-142527

SUMMARY

Problem to be Solved

According to the configuration relating to the conventional person tracking, the system configuration or system components such as the number of cameras, the installation position, the shooting state, the resources of the computer for performing data processing, and a network for connecting a plurality of computers with each other are configured centrally under a fixed condition.

Therefore, in the configuration according to the conventional person tracking, for example, when changes such as an increase in the number of cameras, addition of new services and new functions for realizing the new services, and sharing of cameras in other services are required for one system in operation, it becomes necessary to review the system configuration, the data flow, and the function and performance of each element.

That is, according to the configuration of the conventional person tracking, there is a problem that the configuration cannot be changed during operation.

It is an object of the present disclosure to provide a person tracking system in which the configuration can be changed even during operation.

Means for Solving the Problem

According to an example aspect of the present invention, there is provided a person tracking system comprising:

a calculation processing means configured to perform processing for detecting a first person from an image, and calculate a first feature vector representing a feature of the detected first person;

a data transmission processing means configured to acquire a hash value corresponding to a key generated based on information relating to the first feature vector, and store feature data including the first feature vector and the key in a storage area of an external device determined based on the acquired hash value;

a determination processing means configured to determine whether or not the first person represented by the first feature vector included in the feature data read from the external device and a second person registered in advance are a same person; and a tracking processing means configured to track the first person as a tracking target, when it is determined that the first person and the second person are the same person.

According to another example aspect of the present invention, there is provided a person tracking method comprising:

performing processing for detecting a first person from an image, and calculating a first feature vector representing a feature of the detected first person;

acquiring a hash value corresponding to a key generated based on information relating to the first feature vector, and storing feature data including the first feature vector and the key in a storage area of an external device determined based on the acquired hash value;

determining whether or not the first person represented by the first feature vector included in the feature data read from the external device and a second person registered in advance are a same person; and tracking the first person as a tracking target, when it is determined that the first person and the second person are the same person.

According to still another example aspect of the present invention, there is provided a recording medium recording a program, the program causing a computer to execute:

performing processing for detecting a first person from an image, and calculating a first feature vector representing a feature of the detected first person;

acquiring a hash value corresponding to a key generated based on information relating to the first feature vector, and storing feature data including the first feature vector and the key in a storage area of an external device determined based on the acquired hash value;

determining whether or not the first person represented by the first feature vector included in the feature data read from the external device and a second person registered in advance are a same person; and tracking the first person as a tracking target, when it is determined that the first person and the second person are the same person.

Effect

According to the present disclosure, it is possible to provide a person tracking system in which the configuration can be changed even during operation.

EXAMPLE EMBODIMENTS

Preferred example embodiments of the present disclosure will be described with reference to the accompanying drawings.

First Example Embodiment

[System Configuration]

Figure 1:
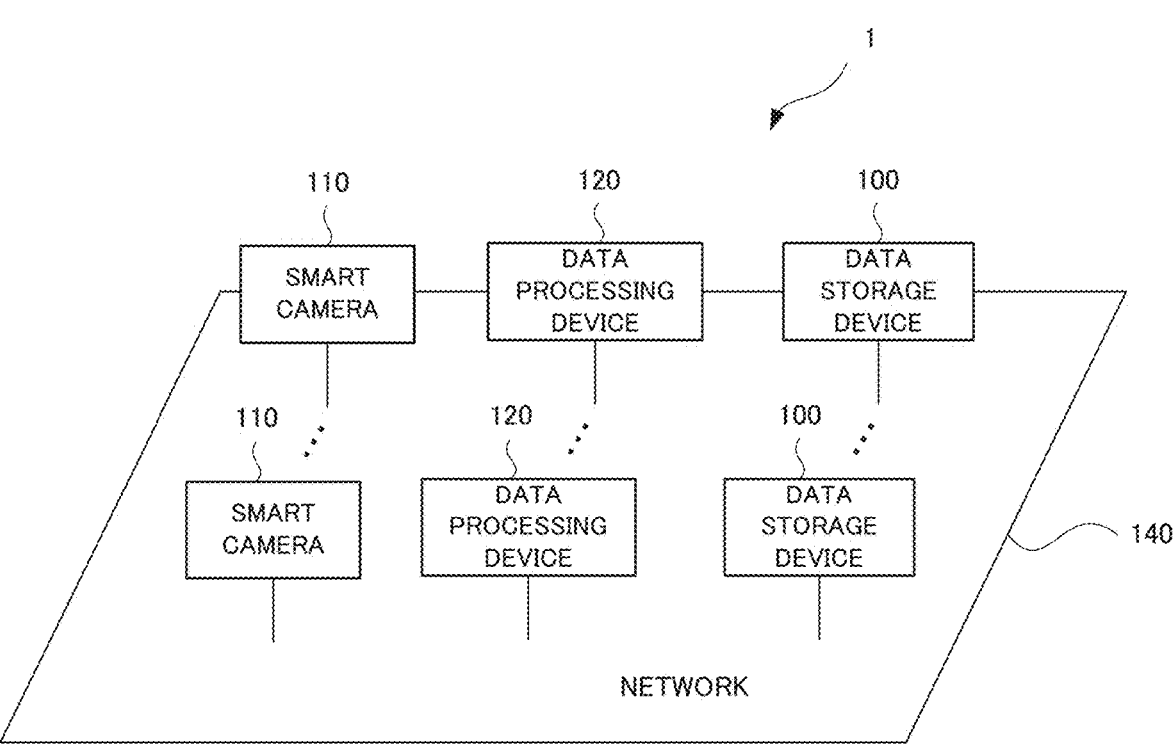
FIG. 1 shows a schematic configuration of a person tracking system according to a first example embodiment.

FIG. 1 is a diagram illustrating a schematic configuration of a person tracking system according to a first example embodiment.

As shown in FIG. 1, the person tracking system 1 is configured to include a plurality of data storage devices 100, a plurality of smart cameras 110, and a plurality of data processing devices 120. The plurality of data storage devices 100, the plurality of smart cameras 110, and the plurality of data processing devices 120 are connected to the network 140. In addition, the plurality of smart cameras 110 is arranged at the position where it is possible to shoot the same place in a store from different angles, or positions where it is possible to shoot a continuous space such as a road by shifting an area in order.

[Hardware Configuration]

Figure 2:
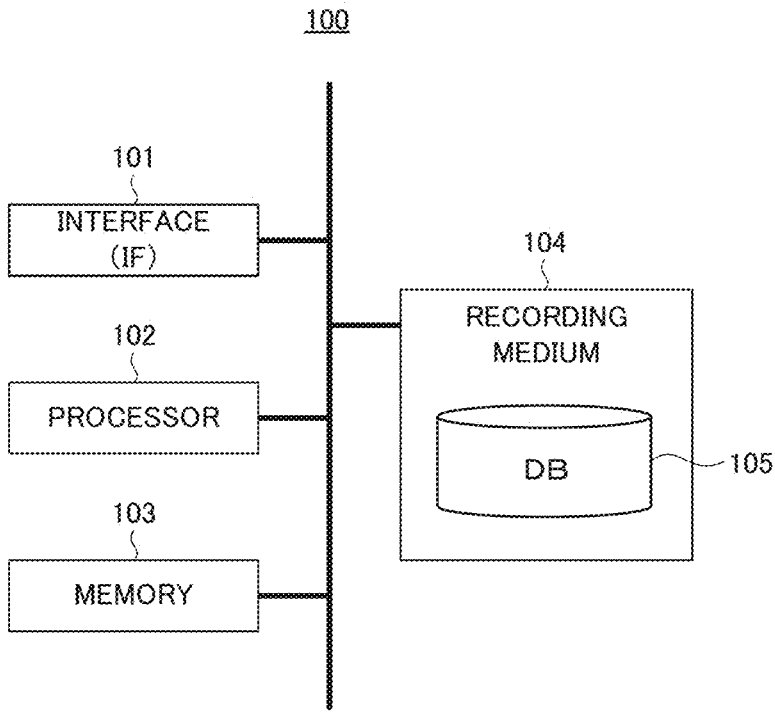
FIG. 2 is a block diagram illustrating a hardware configuration of a data storage device according to the first example embodiment.

FIG. 2 is a block diagram illustrating a hardware configuration of a data storage device according to the first example embodiment.

The data storage device 100 includes an interface (IF) 101, a processor 102, a memory 103, a recording medium 104, and a database 105, as shown in FIG. 2.

The IF 101 inputs and outputs data to and from devices connected to the network 140.

The processor 102 is a computer, such as a CPU (Central Processing Unit), that controls the entire data storage device 100 by executing a predetermined program.

The memory 103 may be a ROM (Read Only Memory), a RAM (Random Access Memory), and the like. The memory 103 is also used as a working memory during various processing operations by the processor 102.

The recording medium 104 is a non-volatile and non-transitory recording medium such as a disk-like recording medium or a semiconductor memory, and is configured to be detachable from the data storage device 100. Further, the recording medium 104 stores, for example, data inputted through the IF 101 and the processing results obtained by the processing of the processor 102. The recording medium 104 includes the database 105.

The database 105 manages the data stored in the recording medium 104.

Figures 3, 4:
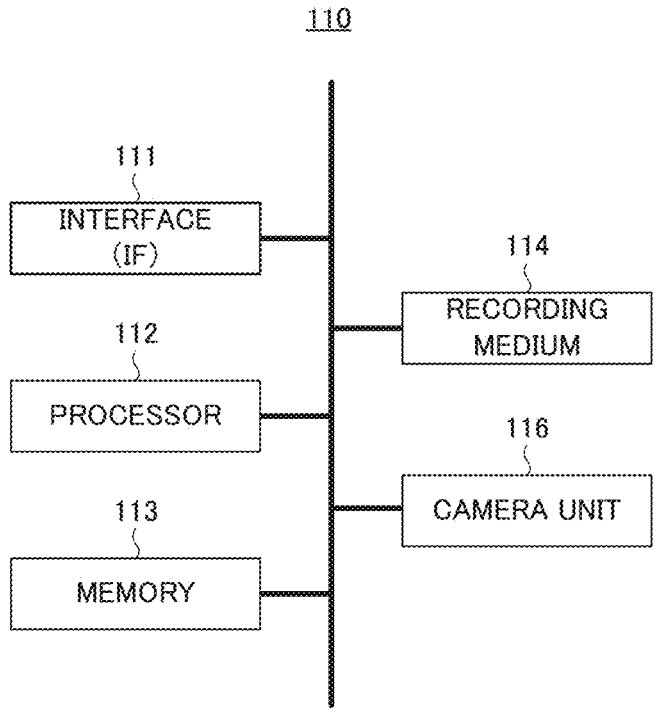
FIG. 3 is a block diagram showing a hardware configuration of a smart camera according to the first example embodiment.
FIG. 4 is a block diagram illustrating a hardware configuration of a data processing device according to the first example embodiment.

FIG. 3 is a block diagram illustrating a hardware configuration of the smart camera according to the first example embodiment.

As shown in FIG. 3, the smart camera 110 includes an interface (IF) 111, a processor 112, a memory 113, a recording medium 114, and a camera unit 116.

The IF 111 inputs and outputs data to and from devices connected to the network 140.

The processor 112 is a computer, such as a CPU, that controls the entire smart camera 110 by executing a predetermined program.

The memory 113 is configured by a ROM, RAM, or the like. The memory 113 is also used as a working memory during various processing operations by the processor 112.

The recording medium 114 is a non-volatile and non-transitory recording medium such as a disk-like recording medium, a semiconductor memory, or the like, and is configured to be detachable from the smart camera 110. In addition, images shot by the camera unit 116 are recorded in the recording medium 114. In the present example embodiment, various programs to be executed by the processor 112 are recorded on a different recording medium from the recording medium 114. When the smart camera 110 performs various processing, a program stored in the different recording medium as described above is loaded into the memory 113 and executed by the processor 112.

The camera unit 116 acquires images by shooting a predetermined area in a store, a road, or the like.

FIG. 4 is a block diagram illustrating a hardware configuration of a data processing device according to the first example embodiment.

The data processing device 120 includes an interface (IF) 121, a processor 122, a memory 123, and a recording medium 124, as illustrated in FIG. 4.

The IF 121 inputs and outputs data to and from devices connected to the network 140.

The processor 122 is a computer, such as a CPU, that controls the entire data processing device 120 by executing a program prepared in advance.

The memory 123 is configured by a ROM or a RAM. The memory 123 is also used as a working memory during various processing operations by the processor 122.

The recording medium 124 is a non-volatile and non-transitory recording medium such as a disk-like recording medium or a semiconductor memory, and is detachable to the data processing device 120. The recording medium 124 records various programs to be executed by the processor 122. When the data processing device 120 executes various kinds of processing, the program recorded in the recording medium 124 is loaded into the memory 123 and executed by the processor 122.

[Functional Configuration]

Figure 5:
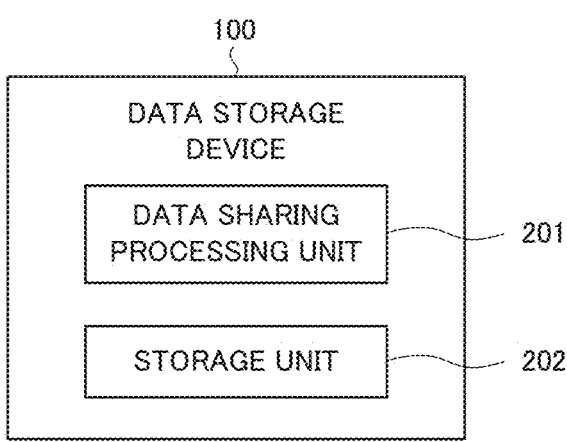
FIG. 5 is a diagram showing a functional configuration of the data storage device according to the first example embodiment.

FIG. 5 is a diagram illustrating a functional configuration of the data storage device according to the first example embodiment.

As shown in FIG. 5, the data storage device 100 includes a data sharing processing unit 201 and a storage unit 202.

The data sharing processing unit 201 performs processing related to the control of reading and writing data. Specifically, the data sharing processing unit 201 performs, for example, processing related to parallelization of a plurality of data, processing for designating a place for storing data, processing for determining a data unit when reading or writing data, and the like. The data sharing processing unit 201 has a function as an interface for performing communication with each device connected to the network 140.

The storage unit 202 stores data received by the data sharing processing unit 201.

Figure 6:
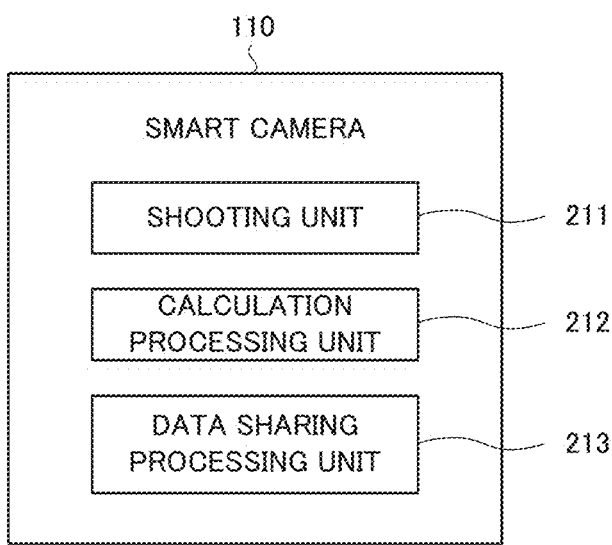
FIG. 6 is a diagram showing a functional configuration of the smart camera according to the first example embodiment.
Figure 7:
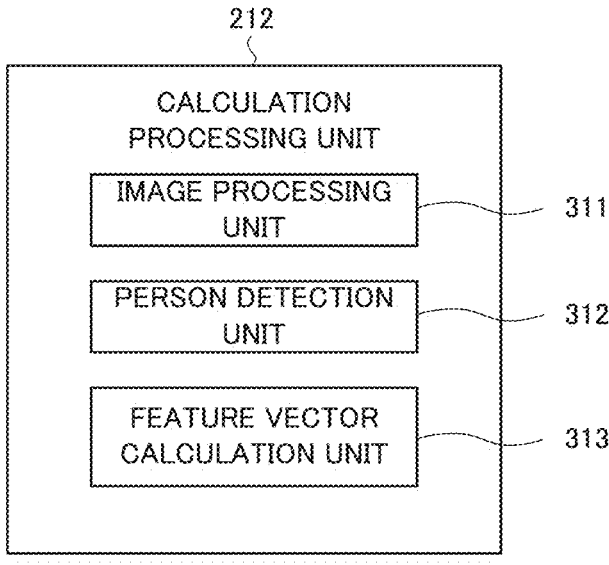
FIG. 7 is a diagram showing a functional configuration of a calculation processing unit according to the first example embodiment.

FIG. 6 is a diagram illustrating a functional configuration of the smart camera according to the first example embodiment. FIG. 7 is a diagram illustrating a functional configuration of a calculation processing unit according to the first example embodiment.

As shown in FIG. 6, the smart camera 110 includes a shooting unit 211, a calculation processing unit 212, and a data sharing processing unit 213.

The shooting unit 211 acquires images by shooting a predetermined area in a store, a road, or the like.

The calculation processing unit 212 performs processing for detecting a person from the image acquired by the shooting unit 211, and also performs processing for calculating a feature vector representing a feature of the detected person. As shown in FIG. 7, the calculation processing unit 212 includes an image processing unit 311, a person detection unit 312, and a feature vector calculation unit 313.

The image processing unit 311 performs image processing such as size conversion on the image obtained by the shooting unit 211.

The person detection unit 312 performs processing for detecting a person from the image on which image processing is performed by the image processing unit 311. Also, when a person is detected from the image subjected to the image processing by the image processing unit 311, the person detection unit 312 sets a rectangular area in the image for indicating the position of the detected person. When the person detection unit 312 detects a plurality of persons in the image on which image processing is performed by the image processing unit 311, the person detection unit 312 sets a rectangular area corresponding to each of the plurality of persons in the image.

The feature vector calculation unit 313 calculates the feature vector representing the feature of the person set by the person detection unit 312 based on the pixel value or the like of each pixel in the rectangular area set by the person detection unit 312. The feature vector calculation unit 313 calculates the feature vector corresponding to each of the plurality of rectangular areas when a plurality of persons is detected by the person detection unit 312, i.e., when a plurality of rectangular areas is set by the person detection unit 312.

The data sharing processing unit 213 performs processing related to the control of reading and writing data. Specifically, the data sharing processing unit 213 performs, for example, processing related to parallelization of a plurality of data, processing for designating a place for storing data, processing for determining a data unit when reading or writing data, and the like. The data sharing processing unit 213 has a function as an interface for performing communication with each device connected to the network 140. The data sharing processing unit 213 sets one data storage device 100X, which is the destination of transmitting the feature vectors acquired by the calculation processing unit 212, from among the plurality of data storage devices 100 connected to the network 140. In addition, the data sharing processing unit 213 transmits the feature data including the feature vector acquired by the calculation processing unit 212 to the data storage device 100X. The feature data transmitted to the data storage device 100X is associated with position information indicating a position where the smart camera 110 serving as the destination of transmitting the feature data is installed.

Here, a specific example of the processing relating to the transmission of the feature data performed in the data sharing processing unit 213 will be described.

First, the data sharing processing unit 213 performs processing for generating a key KYX corresponding to the feature vector SVX acquired by the calculation processing unit 212. For example, the key KYX may be generated using unique information such as the time at which the feature vector SVX is calculated.

Next, the data sharing processor 213 acquires a hash value HSA by applying the key KYX to the predetermined hash function and sets a transmission destination of the feature vector SVX corresponding to the hash value HSA. According to the processing of the data sharing processing unit 213, the transmission destination of the feature vector SVX is set to the data storage device 100X, and the memory block address ADX serving as the storage location of the feature vector SVX in the data storage device 100X (the storage unit 202) is set at the same time.

Finally, the data sharing processor 213 generates the feature data TDX including the key KYX and the feature vector SVX, and transmits the generated feature data TDX to the data storage device 100X. According to the processing in the data sharing processing unit 213, the feature vector SVX is stored in the memory block address ADX of the data storage device 100X (the storage unit 202).

That is, the data sharing processing unit 213 has a function as the data transmission processing means. The data sharing processing unit 213 acquires the hash value HSA according to the key KYX generated based on the information relating to the feature vector SVX, and stores the feature data TDX including the feature vector SVX and the key KYX in the storage area (i.e., the memory block address ADX of the data storage device 100X (the storage unit 202)) of the external device which is the storage location determined based on the acquired hash value HSA.

It is noted that the processing according to the specific example described above is individually performed in each of the smart cameras 110. Therefore, according to the processing according to the specific example described above, for example, it is possible to determine that the feature vector SVX acquired by the smart camera 110 is stored in the data storage device 100X, without performing the control for synchronizing the devices connected to the network 140.

Figure 8:
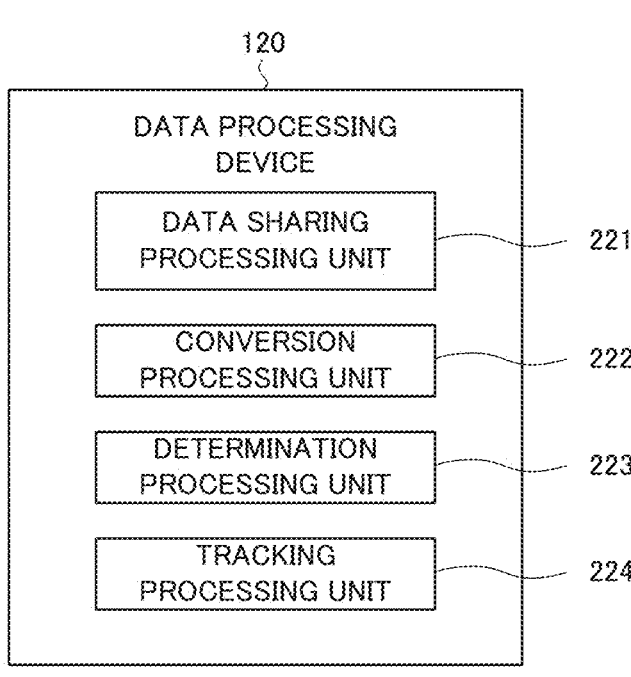
FIG. 8 is a diagram showing a functional configuration of the data processing device according to the first example embodiment.

FIG. 8 is a diagram illustrating a functional configuration of the data processing device according to the first example embodiment.

As shown in FIG. 8, the data processing device 120 includes a data sharing processing unit 221, a conversion processing unit 222, a determination processing unit 223, and a tracking processing unit 224.

The data sharing processing unit 221 performs processing related to control of reading and writing data. Specifically, the data sharing processing unit 221 performs, for example, processing related to parallelization of a plurality of data, processing for specifying a place for storing data, processing for determining a data unit when reading or writing data, and the like. The data sharing processing unit 221 has a function as an interface for performing communication with each device connected to the network 140. The data sharing processing unit 221 performs processing for reading data used in the processing of each unit of the data processing device 120 from the data storage device 100. The data sharing processing unit 221 generates transmission data according to the processing result obtained through the processing of each unit of the data processing device 120, and transmits the generated transmission data to the data storage device 100. Specifically, for example, the data sharing processing unit 221 performs the same processing as the data sharing processing unit 213 on the feature vector SVD to be described later, thereby to set the destination of the feature vector SVD, generate the feature data including the feature vector SVD, and transmit the generated feature data to the transmission destination.

The conversion processing unit 222 acquires the feature data TDX stored in the data storage device 100X through the data sharing processing unit 221. Also, the conversion processing unit 222 acquires the feature data TDY stored in the data storage device 100 through the data sharing processing unit 221.

The feature data TDY includes the feature vector SVY representing the feature of a person PY registered in advance. The feature vector SVY is calculated in advance as a representative vector that best represents the feature of the person PY.

The conversion processing unit 222 converts the feature vector SVX into a hash value HSB by performing calculation using a locally sensitive hashing (hereinafter, also referred to as "LSH") on the feature vector SVX included in the feature data TDX. Also, the conversion processing unit 222 converts the feature vector SVY into a hash value HSC by performing calculation on the feature vector SVY included in the feature data TDY. Incidentally, the calculation using LSH is an example of a stochastic calculation. Therefore, in the present example embodiment, a technique that differs from LSH may be used, as long as the feature vector SVX, the feature vector SVY, and the feature vector SVD to be described later are converted into the hash value by the same stochastic calculation.

The determination processing unit 223 calculates the distance DBC between the hash value HSB and the hash value HSC. The distance DBC may be calculated by a predetermined calculation method such as a Euclidean distance, a Hamiltonian distance, and a cosine distance.

Thereafter, the determination processing unit 223 compares the distance DBC with the threshold TH to determine whether or not the person PX represented by the feature vector SVX and the person PY represented by the feature vector SVY are the same person. The threshold TH may be set as a value in consideration of the calculation method of the distance DBC.

When the distance DBC is equal to or smaller than the threshold TH, the determination processing unit 223 obtains the determination result that the person PX represented by the feature vector SVX and the person PY represented by the feature vector SVY are the same person.

On the other hand, when the distance DBC is larger than the threshold TH, the determination processing unit 223 obtains the determination result that the person PX represented by the feature vector SVX and the person PY represented by the feature vector SVY are not the same person. Such a determination result may be obtained, for example, when the feature vector SVX representing the feature of the person PX is not stored in any of the plurality of data storage devices 100 and when the images obtained by shooting the person PX are unclear.

When the determination processing unit 223 obtains the determination result that the person PX represented by the feature vector SVX and the person PY represented by the feature vector SVY are not the same person, the determination processing unit 223 acquires N (N≥2) pieces of feature data TDZ1, TDZ2, . . . , TDZN different from the feature data TDX and TDY from the data storage device 100 through the data sharing processing unit 221.

The feature data TDZi (1≤i≤N) includes a feature vector SVZi that represents the feature of the person PY by the vector different from the feature vector SVY.

Figure 9:
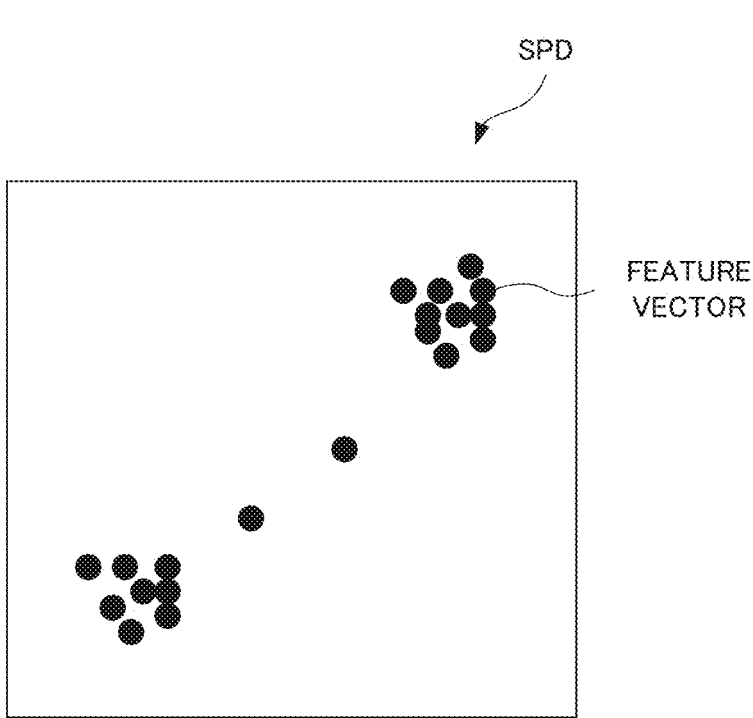
FIG. 9 is a scatter plot generated by plotting feature vectors as data points.

The determination processing unit 223 generates a scatter plot SPD as shown in FIG. 9, for example, by plotting the feature vector SVX and the N feature vectors SVZ1, SVZ2, . . . , SVZN included in the N feature data TDZ1, TDZ2, . . . , TDZN as data points in a predetermined coordinate system. FIG. 9 is a scatter plot generated by plotting the feature vectors as the data points.

Thereafter, the determination processing unit 223 divides the scatter plot SPD into a plurality of rectangular regions (hereinafter, also referred to as "sections") using a plurality of division methods. In addition, the determination processing unit 223 generates a plurality of histograms according to the number of division methods used to divide the scatter plot SPD by counting the number of the data points included in each of the plurality of rectangular regions described above.

Figure 10A:
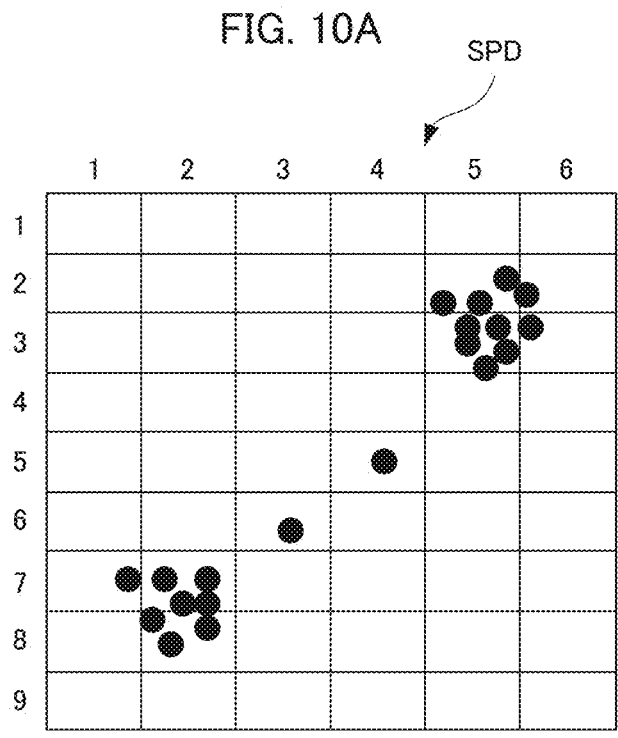
FIG. 10A shows an example of dividing the scatter plot shown in FIG. 9 into multiple sections.
Figure 11A:
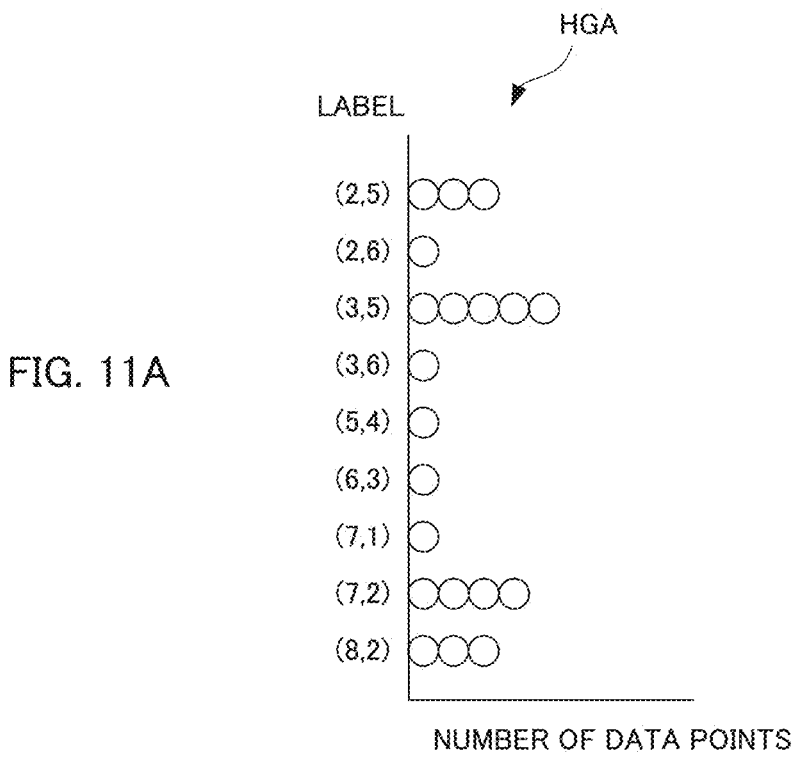
FIG. 11A is a histogram obtained by counting a number of the data points included in each of a plurality of sections in the scatter plot divided as shown in FIG. 10A.

Specifically, the determination processing unit 223 divides the scatter plot SPD into a plurality of sections as shown in FIG. 10A, for example, and counts the number of the data points included in each of the plurality of sections, thereby to acquire a histogram HGA as shown in FIG. 11A. In FIG. 10A, labels of two-dimensional coordinates are given to the sections obtained by dividing the scatter plot SPD to specify the positions of the sections having a predetermined area or more. FIG. 10A is an exemplary diagram in which the scatter plot of FIG. 9 is divided into a plurality of sections. FIG. 11A is a histogram obtained by counting the number of the data points included in each of the plurality of sections in the scatter plot that is divided as shown in FIG. 10A.

Figure 10B:
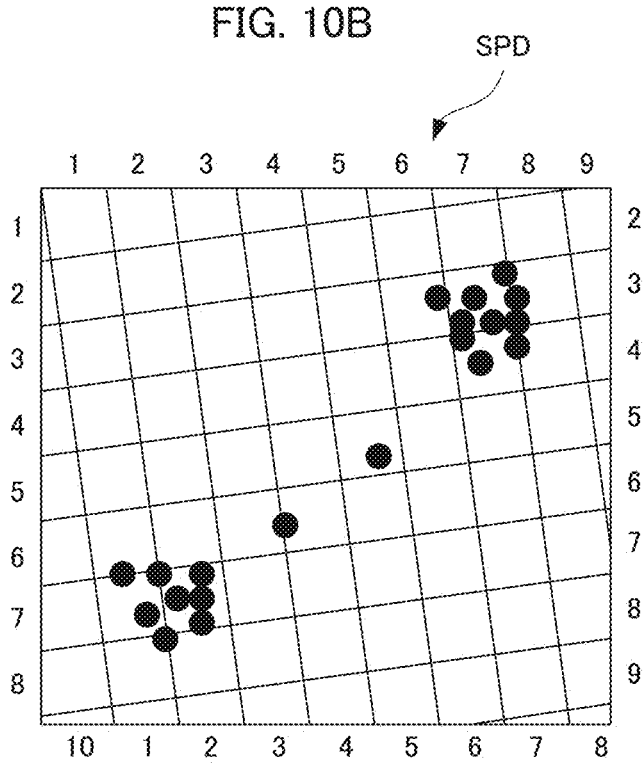
FIG. 10B shows another example of dividing the scatter plot shown in FIG. 9 into multiple sections.
Figure 11B:
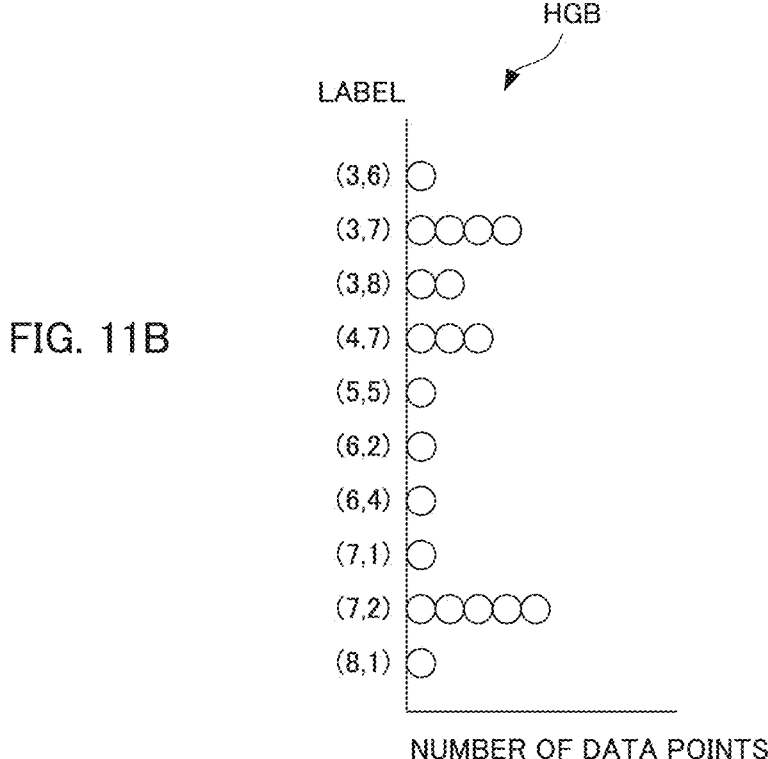
FIG. 11B is a histogram obtained by counting a number of the data points included in each of a plurality of sections in the scatter plot divided as shown in FIG. 10B.

The determination processing unit 223 divides the scatter plot SPD into a plurality of sections as shown in FIG. 10B, for example, and counts the number of the data points included in each of the plurality of sections, thereby to acquire a histogram HGB as shown in FIG. 11B. In FIG. 10B, labels of two-dimensional coordinates are given to the sections obtained by dividing the scatter plot SPD to specify the positions of the sections having a predetermined area or more. FIG. 10B is an exemplary diagram in which the scatter plot of FIG. 9 is divided into a plurality of sections. FIG. 11B is a histogram obtained by counting the number of the data points included in each of the plurality of sections in a scatter plot that is divided as shown in FIG. 10B.

From among the sections obtained by dividing the scatter plot SPD, the determination processing unit 223 extracts sections in which a peak of the number of the data points occurs in each of the plurality of histograms.

Figure 12A:
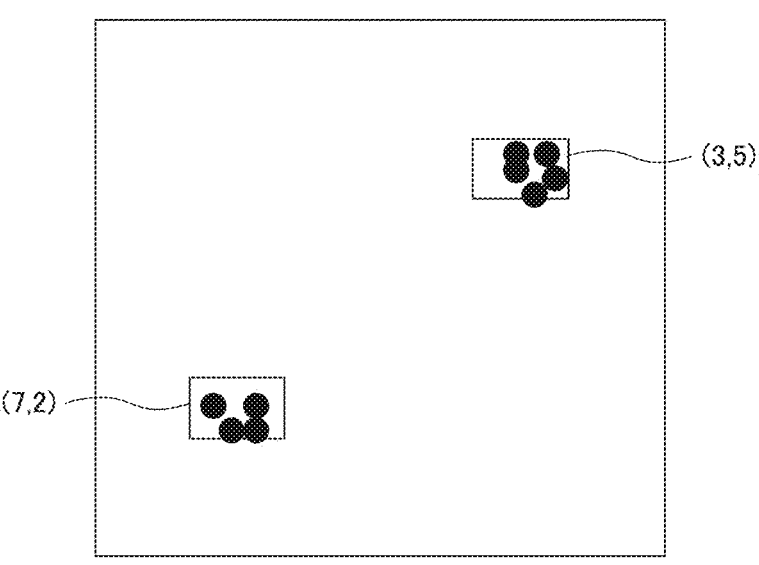
FIG. 12A shows an example of extracting the sections having a peak of the number of data points in the histogram shown in FIG. 11A.

Specifically, based on the histogram HGA shown in FIG. 11A, the determination processing unit 223 extracts the section in which a peak of the number of the data points occurs, from among the sections obtained by dividing the scatter plot SPD as shown in FIG. 10A. By this processing, the determination processing unit 223 extracts the sections (3, 5) and (7, 2) as the sections including a peak of the number of the data points occurs, from among the sections of the scatter plot SPD to which the labels are given as shown in FIG. 10A (see FIG. 12A). FIG. 12A is a diagram illustrating an example of extracting sections in which a peak of the number of the data points occurs in the histogram of FIG. 11A.

Figure 12B:
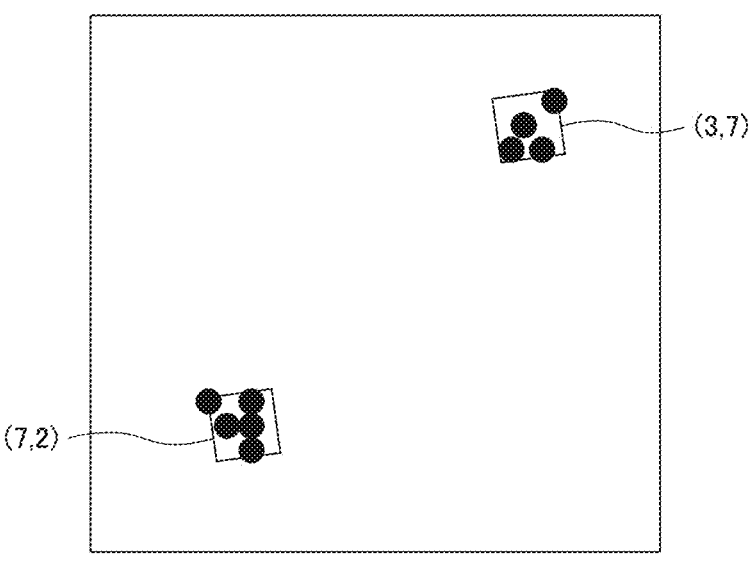
FIG. 12B show an example of extracting the sections having a peak of the number of data points in the histogram shown in FIG. 11A.

Also, based on the histogram HGB shown in FIG. 11B, the determination processing unit 223 extracts the sections in which a peaking of the number of the data points occurs, from among the sections obtained by dividing the scatter plot SPD as shown in FIG. 10B. By this processing, the determination processing unit 223 extracts the sections (3, 7) and (7, 2) as the sections including a peak of the number of the data points, from among the sections of the scatter plot SPD to which labels are given as shown in FIG. 10B (see FIG. 12B). FIG. 12B is a diagram illustrating an example of extracting sections in which a peak of the number of the data points occurs in the histogram of FIG. 11B.

The determination processing unit 223 overlaps the data points in the sections including the peak of the number of the data points in each of the plurality of histograms, and extracts a data point corresponding to the median value of the data points in the overlapped sections as a representative data point DDP.

Figure 13A:
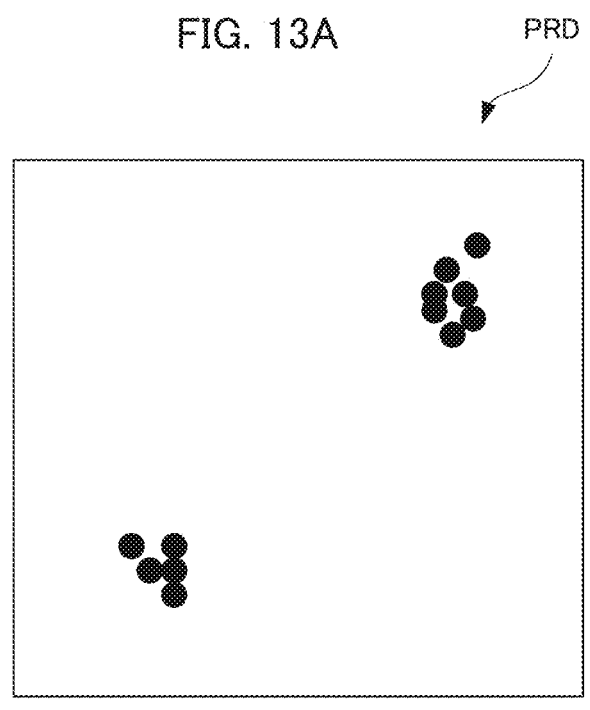
FIG. 13A shows an example of overlapping the data points in FIG. 12A and FIG. 12B.
Figure 13B:
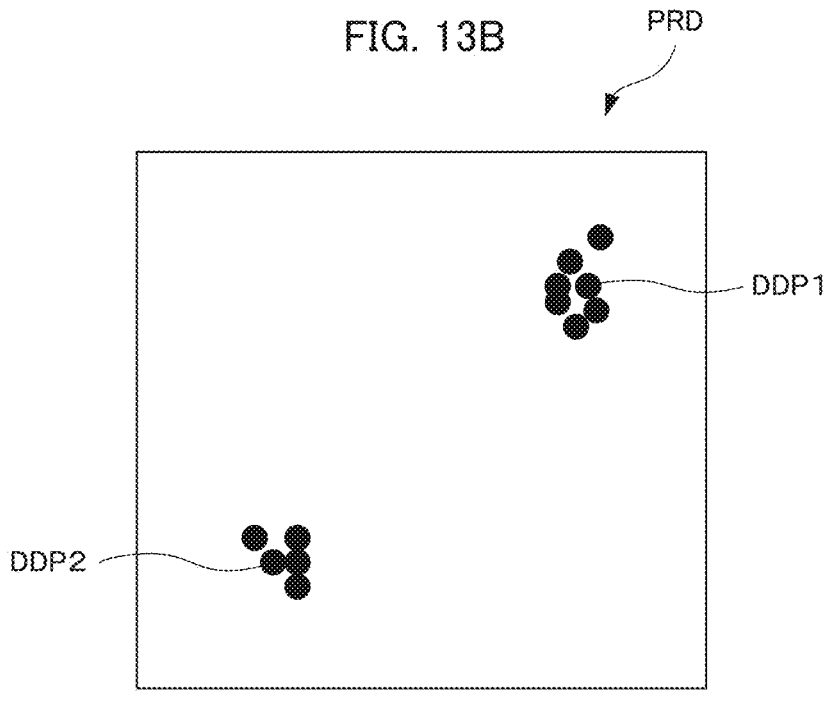
FIG. 13B is a diagram showing an example of extracting the representative data points from the data points shown in FIG. 13A.

Specifically, the determination processing unit 223 overlaps the points in the section (3, 5) shown in FIG. 12A with the data points in the section (3, 7) shown in FIG. 12B, and overlaps the point in the section (7,2) shown in FIG. 12A with the data points in the section (7, 2) shown in FIG. 12B, thereby to generate a plot diagram PRD as shown in FIG. 13A. Further, the determination processing unit 223 extracts two representative data points DDP1 and DDP2 as shown in FIG. 13B, from among the data points included in the plot diagram PRD, for example. Further, the determination processing unit 223 acquires two feature vectors SVD1 and SVD2 corresponding to the two representative data points DDP1 and DDP2. FIG. 13A is a diagram showing an example of overlapping the respective data points of FIGS.

12A and 12B. FIG. 13B is a diagram showing an example of extracting the representative data points from among the data points in FIG. 13A.

Here, in the present example embodiment, a plurality of division methods used to divide the scatter plot SPD into a plurality of sections are randomly determined as a division method that satisfies a predetermined condition defined by the size of the sections after the division or the like. Therefore, in the present example embodiment, the processing shown in FIGS. 9 to 13B can be treated as stochastic processing for acquiring the feature vectors SVD1 and SVD2 using the N feature vectors SVZ1, SVZ2, . . . , SVZN. That is, the determination processing unit 223 of the present example embodiment performs stochastic processing for acquiring the feature vectors SVD1 and SVD2 using the feature vectors SVZ1, SVZ2, . . . , SVZN representing the feature of the person PY and different from the feature vector SVY.

The conversion unit 222 specifies one feature vector SVD corresponding to one representative data point DDP nearest from the data point corresponding to the feature vector SVX, from among the two feature vectors SVD1 and SVD2 obtained by the determination processing unit 223. The conversion processing unit 222 converts the feature vector SVD into a hash value HSD by performing calculation using LSH on the feature vector SVD.

The determination processing unit 223 calculates the distance DBD between the hash value HSB and the hash value HSD. The distance DBD may be calculated by the same calculation method as the distance DBC.

Thereafter, the determination processing unit 223 compares the distance DBD with the threshold TH to determine whether or not the person PX represented by the feature vector SVX and the person PY represented by the feature vector SVD are the same person.

When the distance DBD is equal to or smaller than the threshold TH, the determination processing unit 223 obtains the determination result that the person PX represented by the feature vector SVX and the person PY represented by the feature vector SVD are the same person. In addition, when such a determination result is obtained, the determination processing unit 223 updates the feature vector SVY stored in the data storage device 100 as the representative vector that best represents the feature of the person PY, with the feature vector SVD.

On the other hand, when the distance DBD is larger than the threshold TH, the determination processing unit 223 obtains the determination result that the person PX represented by the feature vector SVX and the person PY represented by the feature vector SVD are not the same person. When such a determination result is obtained, the feature vector SVY stored in the data storage device 100 as the representative vector that best represents the feature of the person PY is maintained. In addition, when such a determination result is obtained, the determination processing unit 223 stores the feature vector SVX in a location different from the feature vector SVY and registers the person PX represented by the feature vector SVX as a new tracking target in the data storage device 100.

According to the processing of the determination processing unit 223 as described above, it is determined whether or not the person PX and the person PY are the same person by using the hash values obtained by converting the feature vectors. Therefore, according to the processing of the determination processing unit 223 as described above, it is possible to reduce the processing load of tracking a person performed in the data processing device 120.

Further, according to the processing of the determination processing unit 223 as described above, it is possible to determine whether or not the person PX and the person PY are the same person by using the feature vector SVD obtained by the processing illustrated in FIGS. 9 to 13B. Therefore, according to the processing of the determination processing unit 223 as described above, even when the variation occurs in the group of the feature vectors representing the feature of the person PX, it is possible to accurately perform determination of whether or not the person PX and the person PY are the same person.

When the determination result indicating that the person PX and the person PY are the same person is obtained by the determination processing unit 223, the tracking processing unit 224 extracts P (P≥2) piece of feature data TDX1, TDX2, . . . , TDXP including the feature vector representing the feature of the person PX from the respective feature data stored in the data storage device 100. The tracking processing unit 224 tracks the person PX as the tracking target based on the moving route of the person PX identified by the position information associated with each of the P feature data TDX1, TDX2, . . . , TDXP.

When a missing portion exists in the moving route of the person PX identified by the P feature data TDX1, TDX2, . . . , TDXP, the tracking processing unit 224 complements the missing portion by performing processing using a Kalman filter or the like.

[Processing Flow]

Figure 14:
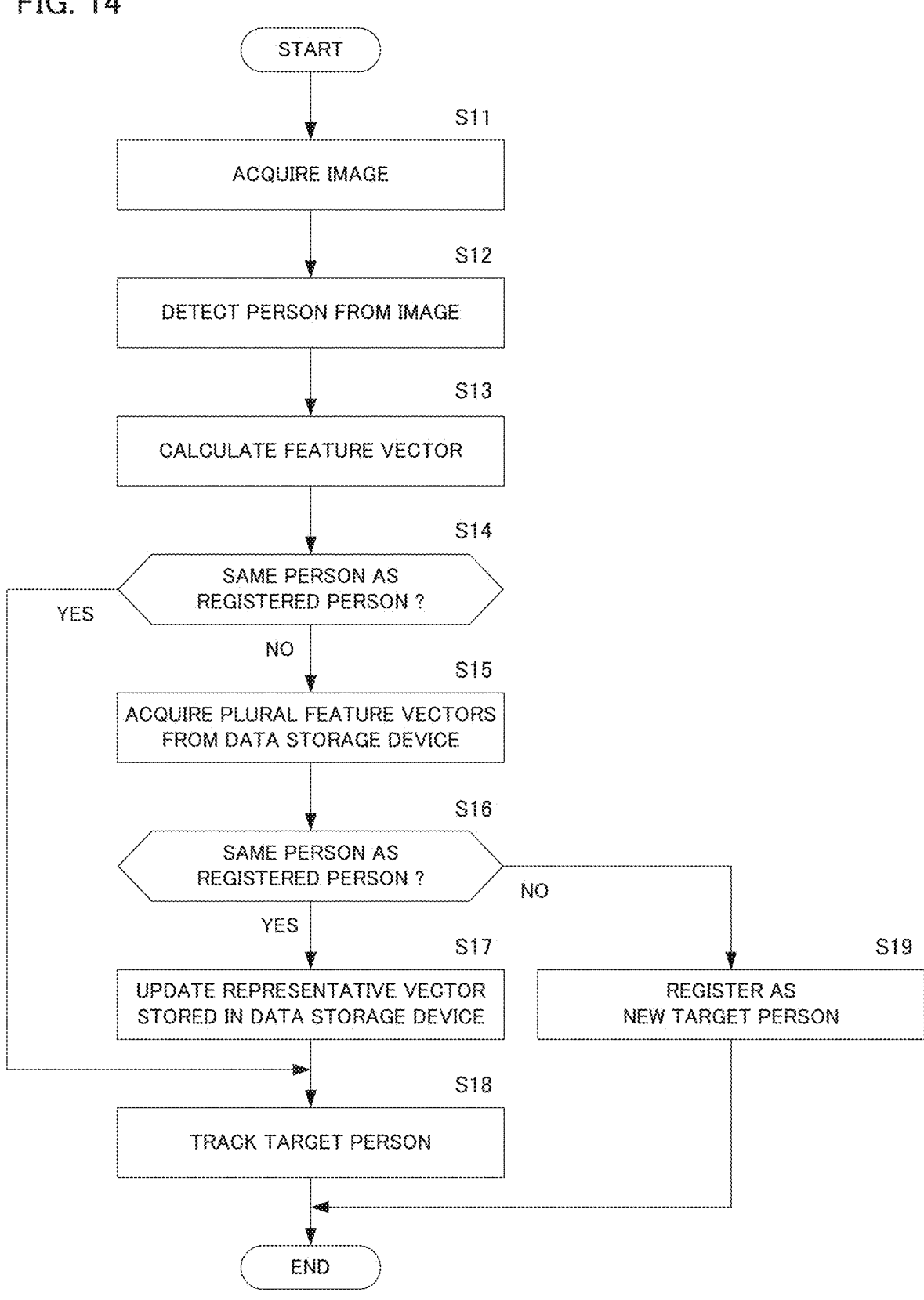
FIG. 14 is a flowchart for explaining processing performed in the person tracking system according to the first example embodiment.

Next, a flow of processing performed in the person tracking system will be described. FIG. 14 is a flowchart for explaining processing performed in the person tracking system according to the first example embodiment.

First, the shooting unit 211 of the smart camera 110 acquires an image by shooting a predetermined area in a store, a road, or the like (step S11).

Next, the calculation processing unit 212 of the smart camera 110 performs processing for detecting a person from the image acquired in step S11 (step S12), and performs processing for calculating the feature vector SVX representing the feature of the detected person (step S13). The feature vector SVX calculated in step 13 is transmitted from the data sharing processing unit 213 of the smart camera 110 via the network 140 and stored in the data storage device 100.

Thereafter, the determination processing unit 223 of the data processing device 120 calculates the distance DBC between the hash value HSB obtained by converting (in the conversion processing unit 222) the feature vector SVX calculated in step S13 and the hash value HSC obtained by converting (in the conversion processing unit 222) the feature vector SVY stored in the data storage device 100 as the representative vector that best represents the characteristics of the person registered in advance. Then, by comparing the distance DBC calculated as described above with the predetermined threshold TH, the determination processing unit 223 determines whether or not the person represented by the feature vector SVX calculated in step S13 and the person represented by the feature vector (representative vector) SVY stored in the data storage device 100 are the same person (step S14).

When the determination processing unit 223 obtains the determination result indicating that the person represented by the feature vector SVX calculated in step S13 and the person represented by the feature vector (representative vector) SVY stored in the data storage device 100 are the same person (step S14: YES), the processing proceeds to step S18 described later. When the determination processing unit 223 obtains the determination result indicating that the person represented by the feature vector SVX calculated in step S13 and the person represented by the feature vector (representative vector) SVY stored in the data storage device 100 are not the same person (step S14: NO), the determination processing unit 223 acquires a plurality of feature vectors from the data storage device 100 (step S15). It is noted that the plurality of feature vectors acquired in step S15 does not include the feature vector SVX calculated in step S13 and the feature vector (representative vector) SVY acquired to be used in the process in step S14. Also, it is noted that each of the plurality of feature vectors acquired in step S15 is assumed to represent the same person as the person represented by the feature vector (representative vector) SVY.

The determination processing unit 223 performs processing illustrated in FIG. 9 to FIG. 13B using the plurality of feature vectors acquired in step S15. The determination processing unit 223 calculates a distance DBD between the hash value HSB obtained by converting the feature vector SVX calculated in step S13 (in the conversion processing unit 222) and the hash value HSD obtained by converting the feature vector SVD obtained by the processing illustrated in FIG. 9 to FIG. 13B (by the conversion processing unit 222). Then, the determination processing unit 223 compares the distance DBD calculated as described above with the predetermined threshold TH, and determines whether or not the person represented by the feature vector SVX calculated in step S13 and the person represented by the feature vector SVD obtained through the processing illustrated in FIG. 9 to FIG. 13B are the same person (step S16).

When the determination processing unit 223 obtains the determination result indicating that the person represented by the feature vector SVX calculated in step S13 and the person represented by the feature vector SVD obtained through the processing illustrated in FIG. 9 to FIG. 13B are the same person (step S16: YES), the determination processing unit 223 updates the representative vector stored in the data storage device 100 from the feature vector SVY to the feature vector SVD (step S17). Then, the processing proceeds to step S18 described below. When the determination processing unit 223 obtains the determination result indicating that the person represented by the feature vector SVX calculated in step S13 and the person represented by the feature vector SVD obtained through the processing illustrated in FIG. 9 to FIG. 13B are not the same person (step S16: NO), the determination processing unit 223 registers the person represented by the feature vector SVX in the data storage device 100 as a new tracking target person (step S19), and ends the processing.

Based on the determination result obtained in step S14 or S16, the tracking processing unit 224 extracts a plurality of feature vectors representing the feature of the person identified in the determination result from the data storage device 100. In addition, the tracking processing unit 224 tracks the person as the tracking target based on the moving route of the person determined on the basis of the position information of the smart camera associated with each of the plurality of feature vectors extracted from the data storage device 100 (step S18).

As described above, according to the person tracking system 1 of the present example embodiment, a plurality of feature vectors acquired by each of the plurality of smart cameras 110 can be shared by the plurality of data storage devices 100. Also, the data processing device 120 can perform the processing for tracking the tracking target person using the plurality of feature vectors read from any of the plurality of data storage devices 100. Further, according to the person tracking system 1 of the present example embodiment, the processing in each of the plurality of smart cameras 110 and the processing in each of the plurality of data processing devices 120 can be performed without recording or synchronizing the state of each part of the system. Therefore, according to the person tracking system 1 of the present example embodiment, for example, it is possible to change the configuration, such as the increase or decrease in the number of the smart cameras 110 or the data processing device 120, even during operation. In addition, according to the person tracking system 1 of this example embodiment, the processing for calculating the feature vectors and the processing for determining the data storage device 100 that stores the feature vectors are performed in each of the plurality of smart cameras 110. Therefore, according to the person tracking system 1 of the present example embodiment, it is possible to reduce a load of the processing performed in the data processing device 120 and a load of communication performed in the network 140.

Second Example Embodiment

Figure 15:
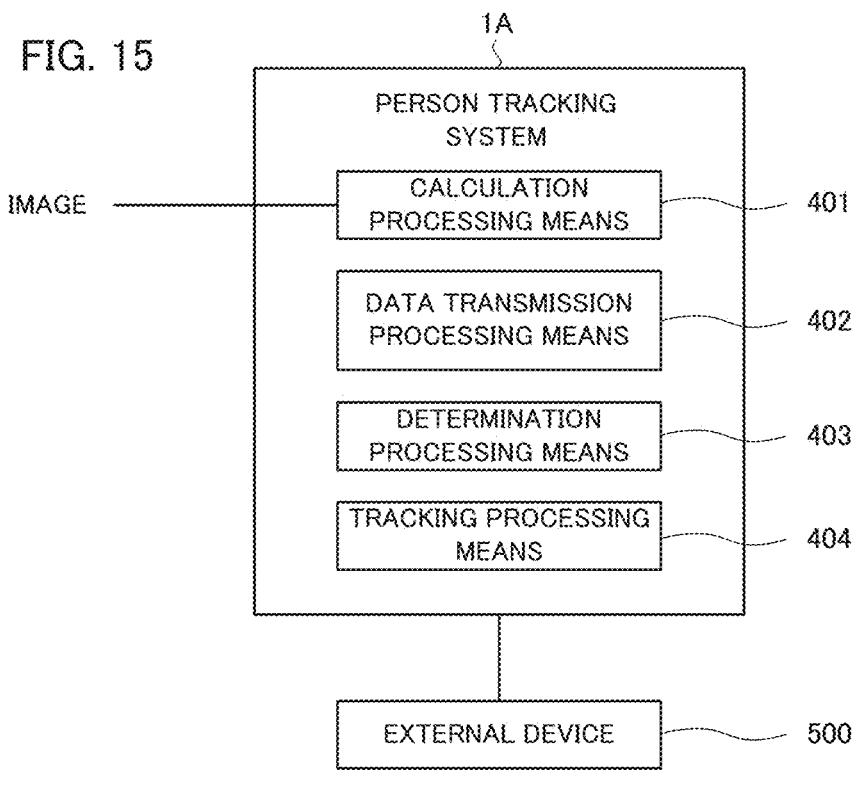
FIG. 15 is a block diagram showing a functional configuration of a person tracking system according to a second example embodiment.

FIG. 15 is a block diagram showing a functional configuration of a person tracking system according to a second example embodiment.

The person tracking system 1A according to the second example embodiment includes a calculation processing means 401, a data transmission processing means 402, a determination processing means 403, and a tracking processing means 404. Further, the components constituting the person tracking system 1A have the same hardware configuration as the data processing device 120.

Figure 16:
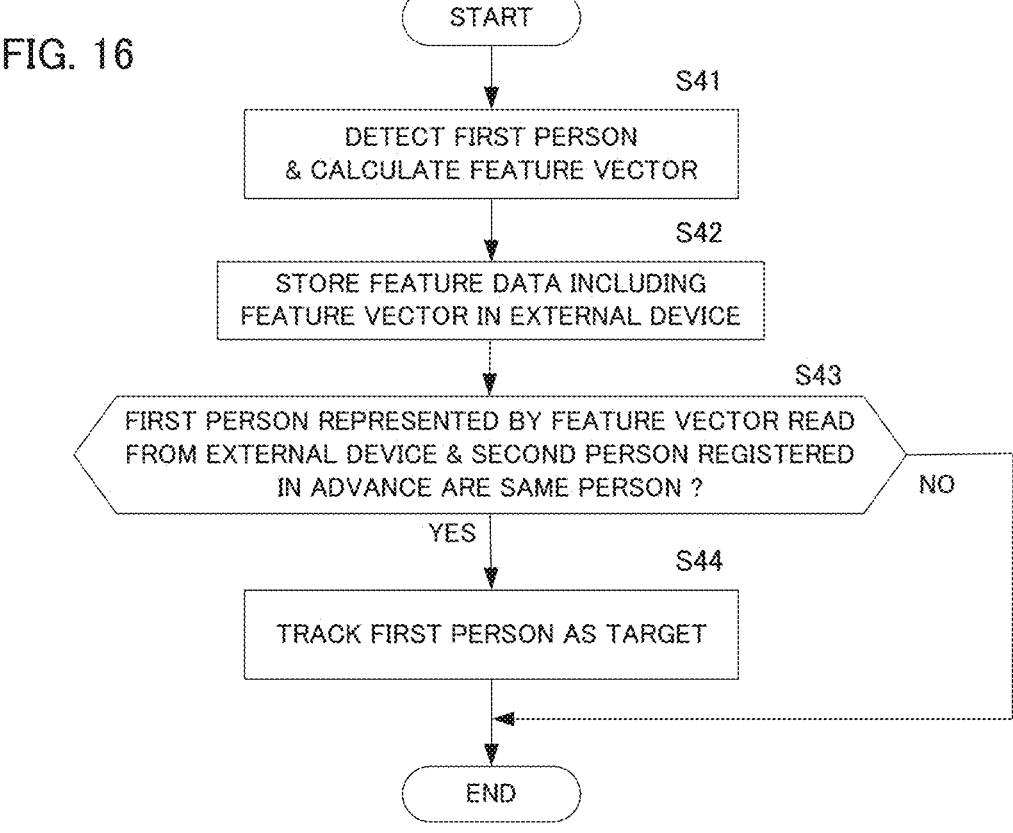
FIG. 16 is a flowchart for explaining processing performed in the person tracking system according to the second example embodiment.

FIG. 16 is a flowchart for explaining processing performed in the person tracking system according to the second example embodiment.

The calculation processing means 401 performs processing for detecting a first person from an image, and calculates a first feature vector representing a feature of the detected first person (step S41).

The data transmission processing means 402 acquires a hash value corresponding to a key generated based on information relating to the first feature vector, and store feature data including the first feature vector and the key in a storage area of an external device 500 determined based on the acquired hash value (step S42).

The determination processing means 403 determine whether or not the first person represented by the first feature vector included in the feature data read from the external device 500 and a second person registered in advance are the same person (step S43). When it is determined that the first person represented by the first feature vector included in the feature data read from the external device 500 and the second person registered in advance are not the same person (step S43: NO), the processing of FIG. 16 is terminated without the executing step S44 described below.

When it is determined that the first person represented by the first feature vector included in the feature data read from the external device 500 and the second person registered in advance are the same person (step S43: YES), the tracking processing means 404 tracks the first person as a tracking target (step S44).

According to the person tracking system 1A accordance to the present example embodiment, it is possible to change the configuration even during operation.

A part or all of the example embodiments described above may also be described as the following supplementary notes, but not limited thereto.

Supplementary Note 1

A person tracking system comprising:

a calculation processing means configured to perform processing for detecting a first person from an image, and calculate a first feature vector representing a feature of the detected first person;

a data transmission processing means configured to acquire a hash value corresponding to a key generated based on information relating to the first feature vector, and store feature data including the first feature vector and the key in a storage area of an external device determined based on the acquired hash value;

a determination processing means configured to determine whether or not the first person represented by the first feature vector included in the feature data read from the external device and a second person registered in advance are a same person; and a tracking processing means configured to track the first person as a tracking target, when it is determined that the first person and the second person are the same person.

Supplementary Note 2

The person tracking system according to Supplementary note 1, wherein the determination processing means determines whether or not the first person and the second person are the same person, based on a distance between a first hash value and a second hash value, the first hash value being calculated by performing a predetermined stochastic calculation on the first feature vector, and the second hash value being calculated by performing the predetermined stochastic calculation on a second feature vector corresponding to a representative vector that best represents a feature of the second person.

Supplementary Note 3

The person tracking system according to Supplementary note 2, wherein, when it is determined that the first person and the second person are not the same person, the determination processing unit performs stochastic processing for acquiring a third feature vector using a plurality of feature vectors representing the feature of the second person by vectors different from the second feature vector, and performs re-determination as to whether or not the first person and the second person are the same person based on a distance between the first hash value and a third hash value, the third hash value being calculated by performing the predetermined stochastic calculation on the third feature vector.

Supplementary Note 4

The person tracking system according to Supplementary note 3, wherein, when it is determined by the re-determination that the first person and the second person are the same person, the determination processing means updates the representative vector from the second feature vector to the third feature vector.

Supplementary Note 5

The person tracking system according to any one of Supplementary notes 2 to 4, wherein the predetermined stochastic calculation is a calculation using locality sensitive hashing.

Supplementary Note 6

A person tracking method comprising:

performing processing for detecting a first person from an image, and calculating a first feature vector representing a feature of the detected first person;

acquiring a hash value corresponding to a key generated based on information relating to the first feature vector, and storing feature data including the first feature vector and the key in a storage area of an external device determined based on the acquired hash value;

determining whether or not the first person represented by the first feature vector included in the feature data read from the external device and a second person registered in advance are a same person; and tracking the first person as a tracking target, when it is determined that the first person and the second person are the same person.

Supplementary Note 7

A recording medium recording a program, the program causing a computer to execute:

performing processing for detecting a first person from an image, and calculating a first feature vector representing a feature of the detected first person;

acquiring a hash value corresponding to a key generated based on information relating to the first feature vector, and storing feature data including the first feature vector and the key in a storage area of an external device determined based on the acquired hash value;

determining whether or not the first person represented by the first feature vector included in the feature data read from the external device and a second person registered in advance are a same person; and tracking the first person as a tracking target, when it is determined that the first person and the second person are the same person.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

1 Person tracking system
100 Data storage device
110 Smart camera
120 Data processing device
202 Storage unit
211 Shooting unit
212 Calculation processing unit
213 Data sharing processing unit
223 Determination processing unit
224 Tracking processing unit

What is claimed is:

1. A person tracking system comprising:

a memory configured to store instructions; and a processor configured to execute the instructions to:

perform processing for detecting a first person from an image, and calculate a first feature vector representing a feature of the detected first person;

acquire a hash value corresponding to a key generated based on information relating to the first feature vector, and store feature data including the first feature vector and the key in a storage area of an external device determined based on the acquired hash value;

determine whether or not the first person represented by the first feature vector included in the feature data read from the external device and a second person registered in advance are a same person; and track the first person as a tracking target, when it is determined that the first person and the second person are the same person.

2. The person tracking system according to claim 1, wherein the processor determines whether or not the first person and the second person are the same person, based on a distance between a first hash value and a second hash value, the first hash value being calculated by performing a predetermined stochastic calculation on the first feature vector, and the second hash value being calculated by performing the predetermined stochastic calculation on a second feature vector corresponding to a representative vector that best represents a feature of the second person.

3. The person tracking system according to claim 2, wherein, when it is determined that the first person and the second person are not the same person, the processor performs stochastic processing for acquiring a third feature vector using a plurality of feature vectors representing the feature of the second person by vectors different from the second feature vector, and performs re-determination as to whether or not the first person and the second person are the same person based on a distance between the first hash value and a third hash value, the third hash value being calculated by performing the predetermined stochastic calculation on the third feature vector.

4. The person tracking system according to claim 3, wherein, when it is determined by the re-determination that the first person and the second person are the same person, the processor updates the representative vector from the second feature vector to the third feature vector.

5. The person tracking system according claim 2, wherein the predetermined stochastic calculation is a calculation using locality sensitive hashing.

6. A person tracking method comprising:

performing processing for detecting a first person from an image, and calculating a first feature vector representing a feature of the detected first person;

acquiring a hash value corresponding to a key generated based on information relating to the first feature vector, and storing feature data including the first feature vector and the key in a storage area of an external device determined based on the acquired hash value;

determining whether or not the first person represented by the first feature vector included in the feature data read from the external device and a second person registered in advance are a same person; and tracking the first person as a tracking target, when it is determined that the first person and the second person are the same person.

7. A non-transitory computer-readable recording medium recording a program, the program causing a computer to execute:

performing processing for detecting a first person from an image, and calculating a first feature vector representing a feature of the detected first person;

acquiring a hash value corresponding to a key generated based on information relating to the first feature vector, and storing feature data including the first feature vector and the key in a storage area of an external device determined based on the acquired hash value;

determining whether or not the first person represented by the first feature vector included in the feature data read from the external device and a second person registered in advance are a same person; and tracking the first person as a tracking target, when it is determined that the first person and the second person are the same person.

\*   \*   \*   \*   \*